United States Patent [19]

Abe et al.

[11] Patent Number: 4,792,007

[45] Date of Patent: Dec. 20, 1988

[54] MECHANISM FOR STEERING FRONT AND REAR WHEELS OF FOUR-WHEEL VEHICLE

[75] Inventors: Masaru Abe; Masami Ogura; Tsuyoshi Sato, all of Saitama, Japan

[73] Assignee: Honda Giken Kogyo Kabushiki Kaisha, Tokyo, Japan

[21] Appl. No.: 88,908

[22] Filed: Aug. 24, 1987

Related U.S. Application Data

[63] Continuation-in-part of Ser. No. 10,177, Feb. 2, 1987, Pat. No. 4,758,012.

[30] Foreign Application Priority Data

Aug. 22, 1986 [JP] Japan ................. 61-196702

[51] Int. Cl.[4] ............................... B62D 5/00
[52] U.S. Cl. ................................ 180/140; 280/91
[58] Field of Search ..................... 280/91; 180/140

[56] References Cited

U.S. PATENT DOCUMENTS

| | | | |
|---|---|---|---|
| 4,467,885 | 8/1984 | Furukawa et al. | 280/91 |
| 4,557,493 | 12/1985 | Sano et al. | 280/91 |
| 4,582,334 | 4/1986 | Tashiro et al. | 280/91 |
| 4,601,357 | 7/1986 | Miyoshi et al. | 180/140 |

FOREIGN PATENT DOCUMENTS

| | | |
|---|---|---|
| 59-70259 | 4/1984 | Japan . |
| 59-70260 | 4/1984 | Japan . |
| 61-181776 | 8/1986 | Japan . |
| 61-181777 | 8/1986 | Japan . |

Primary Examiner—Kenneth R. Rice
Attorney, Agent, or Firm—Irving M. Weiner; Joseph P. Carrier; Pamela S. Burt

[57] ABSTRACT

A mechanism for steering the front and rear wheels of a four-wheel-steerable vehicle includes a front wheel steering device operatively coupled to a steering wheel and having at least a rack-and-pinion gear mechanism having a nonlinear gear ratio, a rear wheel steering device, a linkage shaft operatively connecting the front wheel steering device and the rear wheel steering device to each other, and at least one steering force assisting device disposed in a steering force transmitting path comprising the front wheel steering device, the rear wheel steering device, and the linkage shaft.

7 Claims, 7 Drawing Sheets

STEERING WHEEL TURNING ANGLE

FIG.7(C)

MECHANISM FOR STEERING FRONT AND REAR WHEELS OF FOUR-WHEEL VEHICLE

This is a continuation-in-part of application Ser. No. 10,177 filed Feb. 2, 1987, which issued as U.S. Pat. No. 4,758,012 on July 19, 1988.

BACKGROUND OF THE INVENTION

1. Field of the Invention

The present invention relates to a mechanism for steering the front and rear wheels of a four-wheel-steerable vehicle.

2. Description of the Relevant Art

There are known four-wheel-steerable (4WS) vehicles having a front wheel steering device operatively coupled to a steering wheel and a rear wheel steering device mechanically connected to the front wheel steering device to improve cornering capability. The four-wheel-steerable vehicles however require, of necessity, a greater steering effort than front-wheel-steerable (2WS) vehicles in which only front wheels are turned.

Japanese Laid-Open Patent Publication Nos. 59-70259 and 59-70260 both published Apr. 20, 1984, and Japanese Laid-Open Patent Publications Nos. 61-181776 and 61-181777 both published Aug. 14, 1986 disclose front and rear wheel steering systems in which one or both of front and rear wheel steering devices in a 4WS vehicle have a mechanical variable-gear-ratio mechanism for improving vehicle maneuverability and reducing a steering force required.

Where a gear ratio is selected for greater vehicle maneuverability, the steering force required is large and tends to vary to a large extent. On the other hand, where a gear ratio for a reduced steering force is established, the vehicle maneuverability is apt to be lowered. Actually, therefore, a gear ratio should be determined on a compromise between improved vehicle maneuverability and reduced steering forces required. Not much freedom has been available for selecting gear ratios.

SUMMARY OF THE INVENTION

In view of the aforesaid problem of the conventional front and rear wheel steering mechanism, it is an object of the present invention to provide a mechanism for steering the mechanically coupled front and rear wheels of a 4WS vehicle, the mechanism having greater freedom for selecting gear ratios to allow turning curvatures to be determined more freely with respect to steering wheel turning angles, so that the vehicle can be steered with a light steering force even if the mechanism is designed for improved vehicle maneuverability.

According to the present invention, there is provided a mechanism for steering the front and rear wheels of a four-wheel-steerable vehicle, comprising a front wheel steering device operatively coupled to a steering wheel and having at least a rack-and-pinion gear mechanism having a nonlinear gear ratio, a rear wheel steering device, a linkage shaft operatively connecting the front wheel steering device and the rear wheel steering device to each other, and at least one steering force assisting device disposed in a steering force transmitting path comprising the front wheel steering device, the rear wheel steering device, and the linkage shaft.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
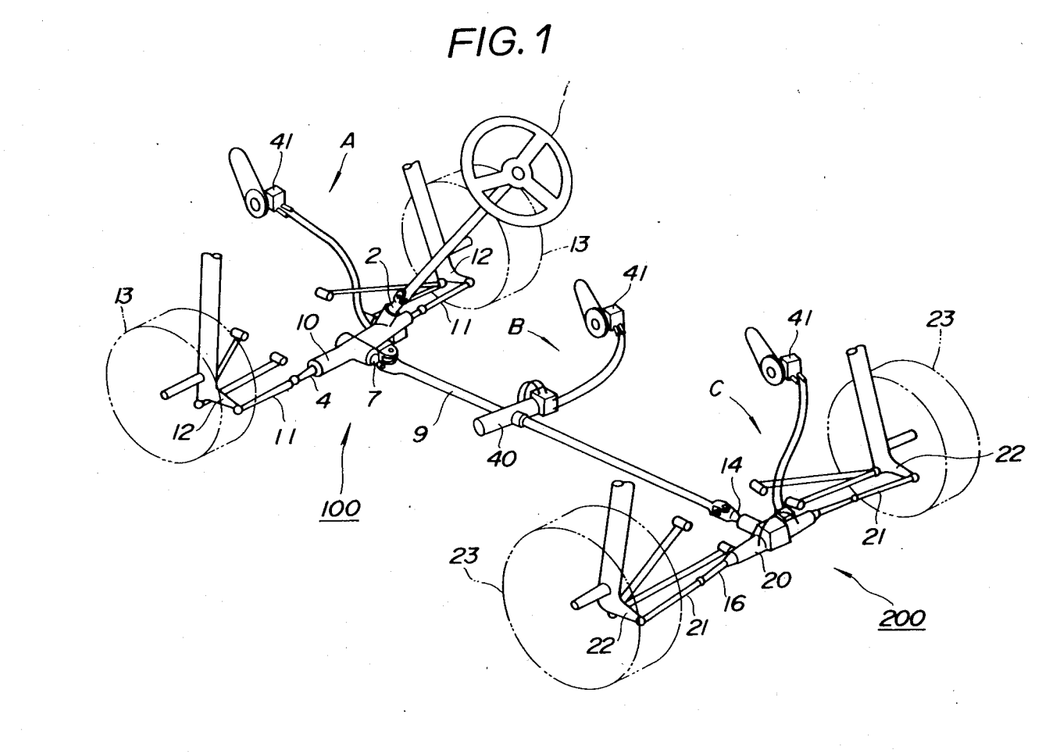
FIG. 1 is a schematic perspective view of a mechanism for steering the front and rear wheels of a four-wheel-steerable vehicle according to the present invention.

As shown in FIG. 1, a mechanism for steering the front and rear wheels of a 4WS vehicle according to the present invention includes a front wheel steering device 100 having a front wheel steering gearbox 10, a rear wheel steering device 200 having a rear wheel steering gearbox 20, and a linkage shaft 9 mechanically connecting the front and rear wheel steering devices 100, 200 to each other.

Figure 2:
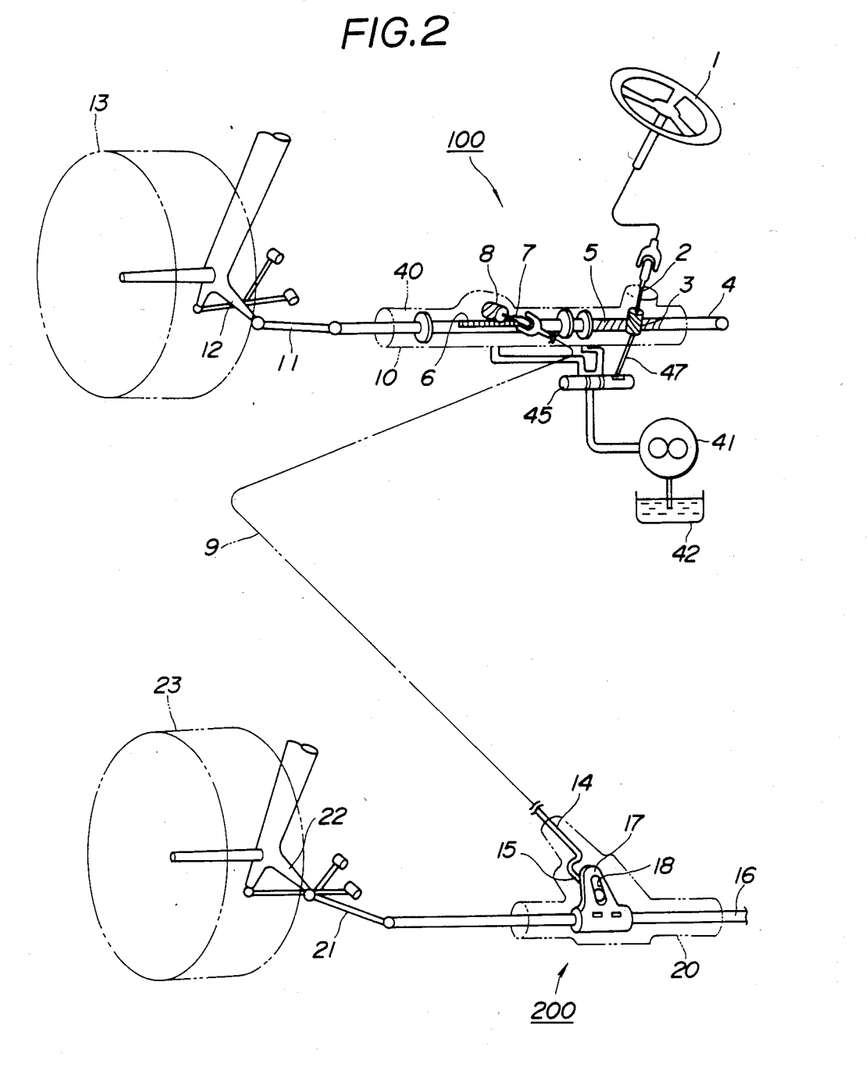
FIG. 2 is a fragmentary perspective view of the mechanism shown in FIG. 1.

As shown in FIG. 2, a rack shaft 4 is axially slidably disposed in the front wheel steering gearbox 10, and a steering shaft 2 and a rotation output shaft 7 are rotatably supported in the front wheel steering gearbox 10. The steering shaft 2 is operatively coupled at its upper end to a steering wheel 1 and has a first pinion 3 on its lower distal end which is held in mesh with a first rack 5 on the rack shaft 4. The rack shaft 4 also has a second rack 6 on one side thereof remote from the first rack 5, the second rack 6 meshing with a second pinion 8 on a front end of the rotation output shaft 7.

Rotative power from the steering wheel 1 as it is turned by the driver is transmitted to the steering shaft 2, and converted through the first pinion 3 and the first rack 5 meshing therewith into lateral axial movement of the rack shaft 4. Such lateral axial movement of the rack shaft 4 causes tie rods 11 and knuckle arms 12 to turn front wheels 13.

The lateral axial movement of the rack shaft 4 is converted by the second rack 6 and the second pinion 8 meshing therewith into rotation of the rotation output shaft 7.

The front wheel steering device 100 is generally constructed as described above. The rear end of the rotation output shaft 7 is operatively connected to the linkage shaft 9, so that the rotative power from the rotation output shaft 7 can be transmitted through the linkage shaft 9 to the rear wheel steering device 200.

A rotation input shaft 14 coupled to the rear end of the linkage shaft 9 is rotatably supported in the rear wheel steering gearbox 20. A joint rod 16 is longitudinally slidably supported in the rear wheel steering gearbox 20. The rear end of the rotation input shaft 14 has a crank-shaped eccentric shaft 15 with its rear end slidably riding in a vertical groove 18 defined in a slider 17 fixed to the joint rod 16.

In response to rotation of the rotation input shaft 14 about its own axis, the eccentric shaft 15 is angularly moved around the axis of the rotation input shaft 14. Such angular movement of the eccentric shaft 15 is converted by the vertical groove 18 of the slider 17 to lateral axial movement of the joint rod 16, causing tie rods 21 and knuckle arms 22 to turn a pair of rear wheels 23. The rear wheel steering device 200 is generally constructed as described above.

Figure 3:
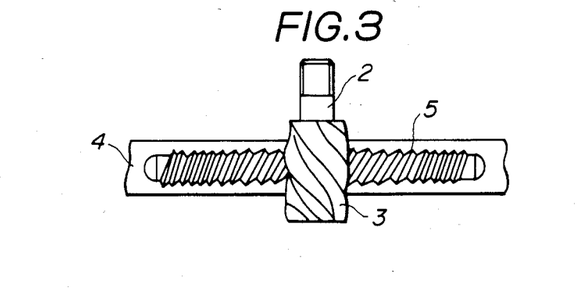
FIG. 3 is a plan view of an arrangement having a nonlinear gear ratio in the mechanism of FIG. 1.
Figure 6:
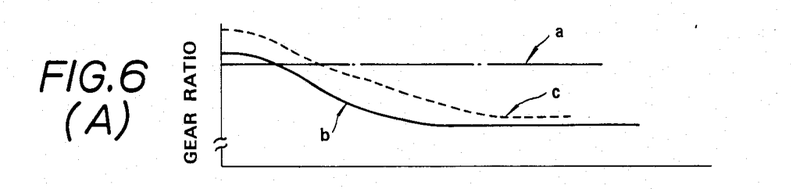
FIGS. 6(A) through 6(D) are diagrams illustrating the characteristic curves of a gear ratio, a front wheel steering angle, a rear wheel steering angle, and a steering force, plotted against a steering wheel turning angle.

In the illustrated embodiment, the ratio of the turning angle of the front wheels 13 to the turning angle of the steering wheel 1 is variable according to the turning angle of the steering wheel 1. More specifically, the front wheel steering device 100 has a nonlinear gear ratio arrangement (or a variable gear ratio arrangement) for turning only the front wheels 13 in nonlinear relation to the turning angle of the steering wheel 1. Such a non-linear gear ratio arrangement is achieved by the first rack 5 (FIG. 3) which has different tooth pitches that provide, as shown in FIG. 6(A), a gear ratio characteristic curve (b) for reducing the steering force or a gear ratio characteristic curve (c) for improving the vehicle maneuverability, these gear ratio characteristic curves (b), (c) being different from a gear ratio characteristic curve (a) which would be provided by a uniform-pitch rack. FIGS. 6(B) and 6(C) show the front and rear wheel turning angles, respectively, with respect to the respective gear ratio characteristic curves (a), (b), and (c), plotted against the steering wheel turning angle. FIG. 6(C) indicates that as the steering wheel turning angle increases, the rear wheels 23 are first turned in the same direction as that of the front wheels 13 and then turned in the opposite direction to that of the front wheels 13.

The front wheel steering device 100 also includes a steering force assisting device A.

Figure 4:
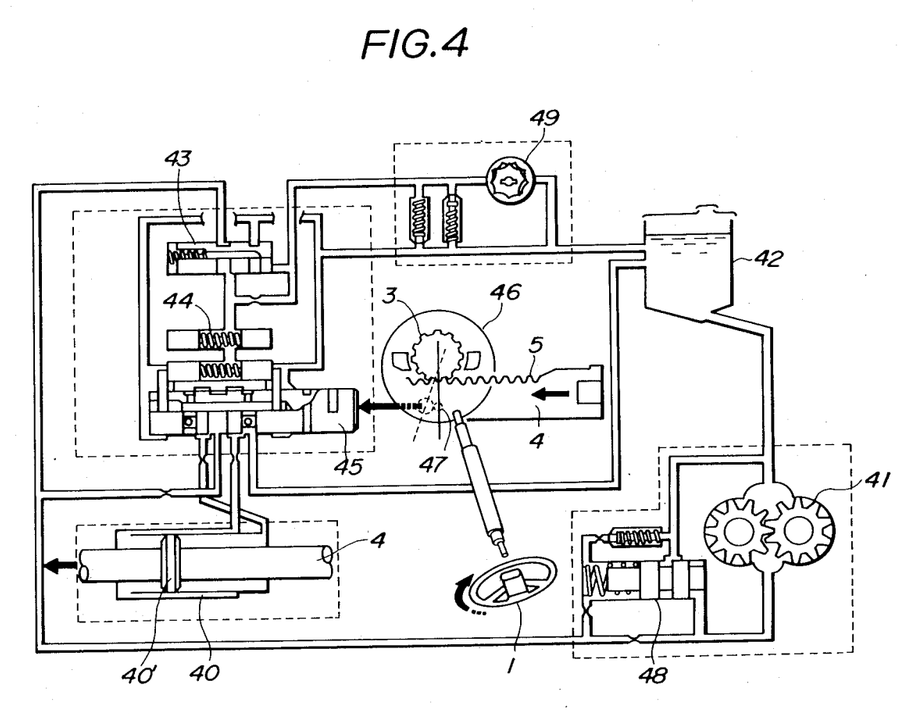
FIG. 4 is a hydraulic circuit diagram of a steering force assisting device in the mechanism of FIG. 1.

The steering force assisting device A has a hydraulic circuit as shown in FIG. 4. The steering force assisting device A comprises an oil pump mechanism mainly comprising an oil tank 42, an oil pump 41, a relief valve 48, a cutoff valve 43, a hydraulic reaction chamber 44, a four-way valve 45, and a vehicle speed sensor 49.

The oil pump 41 is actuated by an engine (not shown) to supply oil under pressure from the oil tank 42 through the cutoff valve 43 and the hydraulic reaction chamber 44 to the four-way valve 45. The steering shaft 2 further has a pinion holder 46 on which the first pinion 3 is eccentrically supported. The pinion holder 46 has a pin 47 on its lower surface which engages the four-way valve 45. As the steering wheel 1 is turned, the pinion holder 46 is also turned to move the pin 47 around the axis of the pinion holder 46 for thereby effecting switching action of the four-way valve 45.

The front wheel steering gearbox 10 houses therein a power cylinder 40 in which there is slidably fitted a piston 40' mounted on the rack shaft 4. The power cylinder 40 communicates with the four-way valve 45.

Figure 5:
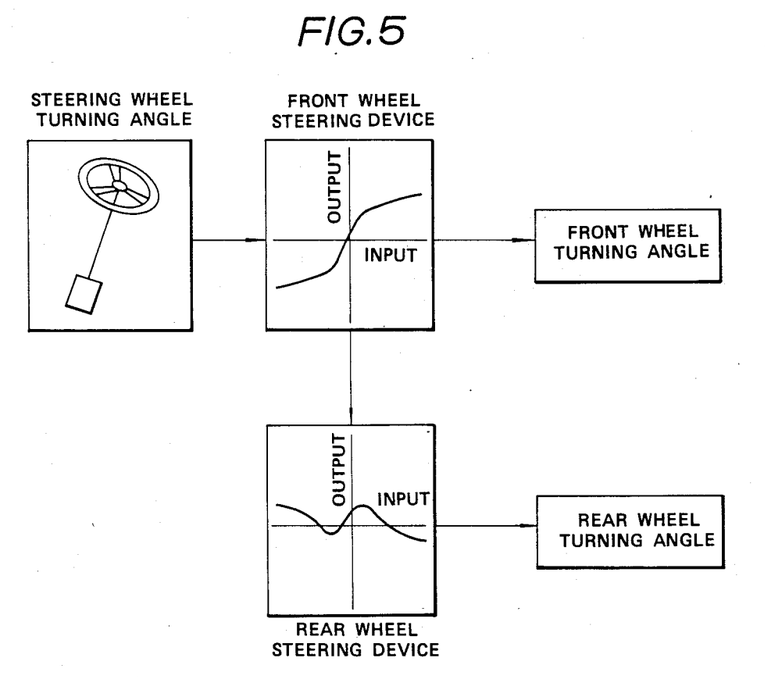
FIG. 5 is a view showing a steering force transmitting system for the mechanism of FIG. 1.

Upon switching action of the four-way valve 45, controlled oil under pressure is supplied to and discharged from the power cylinder 40 to move the piston 40' slidably in the power cylinder 40, thus producing an assistive force to move the rack shaft 4 in the axial direction. Therefore, the manual steering effort required by the driver to turn the front wheels 13 can be reduced.

Where the nonlinear gear ratio characteristic curve (c) (shown in FIG. 6(A)) is employed for the first rack 5 of the front wheel steering device 100, i.e., a nonlinear gear ratio arrangement for improved vehicle maneuverability is employed in the front wheel steering device 100, the front and rear wheels 13, 23 are turned according to turning angle characteristics as shown in FIG. 5.

As shown in FIG. 6(C), the steering wheel turning angles include a crossover angle $\theta$ across which the rear wheel steering action changes from the range in which the rear wheels 23 are turned in the same direction as that of the front wheels 13 into the range in which the rear wheels 23 are turned in the opposite direction to that of the front wheels 13. The crossover anlge $\theta_2$ for the gear ratio characteristic curve (c) for improved vehicle maneuverability is smaller than the crossover angle $\theta_0$ for the gear ratio characteristic curve (a) of the uniform gear pitch rack and the crossover angle $\theta_1$ for the gear ratio characteristic curve (b) for reduced steering forces.

Assuming that the 4WS vehicle is running along a circular path at a constant speed V, that a lateral acceleration (lateral G) is negligibly small as the speed V is sufficiently low with respect to the radius R of the turning circle, and that the cornering force developed with respect to the slip angles of the front and rear tires is linear, i.e., the cornering power has a straight gradient, then the radius R of the turning circle can generally be expressed by the following equation:

$$R = \frac{l(1 + KV^2)}{\delta f - \delta r} \quad \text{(i)}$$

where l is the wheel base, K is a stability factor, δf is the front wheel turning angle, ιr is the rear wheel turning angle.

The stability factor K is given by:

$$K = \frac{Crb - Cfa}{2CfCrb^2} m \quad \text{(ii)}$$

where Cf is the front wheel cornering power, Cf is the rear wheel cornering power, a is the distance between the axle of the front wheels and the center of gravity of the vehicle, b is the distance between the axle of the rear wheels and the center of gravity of the vehicle, m: the weight of the vehicle.

It can be understood from the equation (i) that the radius R of the turning circle is inversely proportional to the difference (δf−δr) between the front and rear wheel turning angles.

Since a change in the rear wheel turning angle with respect to a unit change in the steering wheel turning angle is given by:

$$\Delta \delta r \propto \theta_2 \text{ or } \theta_1 \text{ or } \theta_0,$$

if $\theta_2 < \theta_1$ or $\theta_0$     (iii), then $$\Delta \delta r_2 = A\theta_2 \gamma,$$

$$\Delta \delta r_1 = A\theta_1 \gamma,$$

$$\Delta \delta r_0 = A\theta_0 \gamma,$$

where A is a coefficient and $\gamma$ is the steering wheel turning angle, and $$\Delta \delta r_2 < \Delta \delta r_1 \text{ or } \Delta \delta r_0$$

Now, the following relationship can be obtained for the same change in the steering wheel turning angle:

$$\Delta \delta f - \Delta \delta r_2 > \Delta \delta f - \Delta \delta r_1 \text{ or } \Delta \delta f - \Delta \delta r_0$$

As a result, since the radius R of the turning circle is in inverse proportion to the difference ($\delta f - \delta r$) between the front and rear wheel turning angles, the rate of change $\Delta R$ of the radius of the turning circle for the nonlinear gear ratio arrangement having the gear ratio characteristic curve (c) for improved vehicle maneuverability is smaller than those for the gear ratio arrangements having the gear ratio characteristic curves (a), (b).

In the range in which the lateral G is relatively small, the nonlinear gear ratio arrangement (c) is effective in reducing the tendency of the vehicle to corner quickly in response to the turning of the steering wheel through a certain angle.

In the range in which the rear wheels are turned in the same direction as that of the front wheels, since $\theta_2 > \theta_1$ or $\theta_0$, the nonlinear gear ratio arrangement (c) is effective to increase the rate of change $\Delta R$. This results in the vehicle tending to corner quickly in response to the turning of the steering wheel through a certain angle. Stated otherwise, the vehicle is apt to turn with greater ease.

As described above, the vehicle maneuverability is greatly improved according to the embodiment.

If the steering force assisting device A were not provided in association with the front wheel steering device 100, then a greater steering force would be required as indicated by a steering force curve (c) in FIG. 6(D) than would be with a 2WS vehicle having no steering force assistance as indicated by a steering force curve (d), when the steering wheel 1 starts turning from a neutral position (in which the vehicle runs straight) to turn the rear wheels 23 in the same direction as that of the front wheels 13.

With the front wheel steering device 100 combined with the steering force assisting device A, the required manual steering force can be reduced as indicated by a steering force curve (c') in FIG. 6(D). Accordingly, the vehicle maneuverability can be greatly increased while lowering the necessary steering force.

The nonlinear gear ratio arrangement of the front wheel steering device 100 may be of a nonlinear gear ratio characteristic curve (c) for achieving improved vehicle maneuverability only, as described above.

Figure 7A:
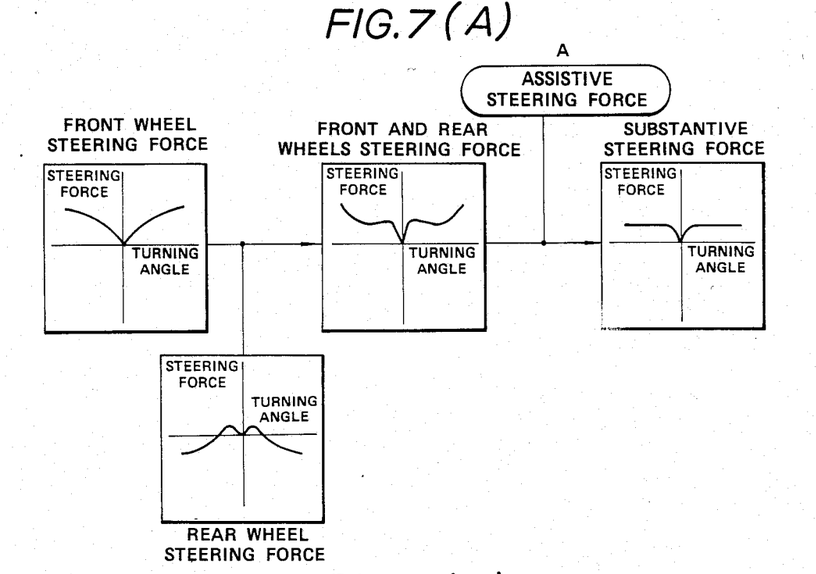
FIG. 7(A) is a view of a system for transmitting a substantial steering force in an arrangement in which the steering force assisting device is associated with a front wheel steering device in the mechanism shown in FIG. 1.
Figure 7B:
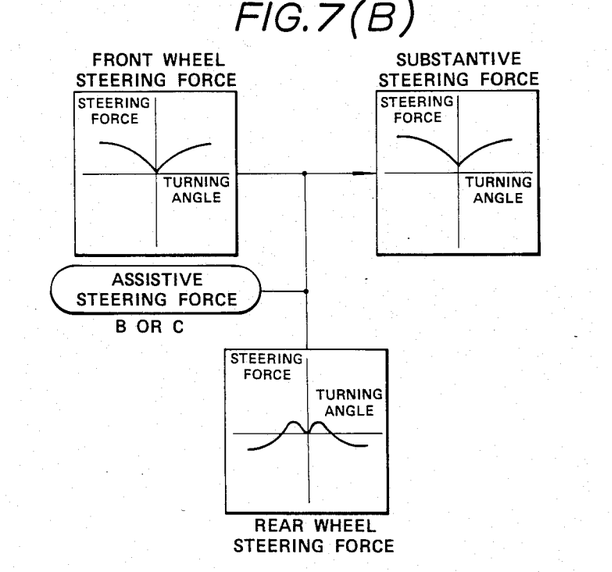
FIG. 7(B) is a view of a system for transmitting a substantial steering force in an arrangement in which the steering force assisting device is associated with a linkage shaft or a rear wheel steering device in the mechanism shown in FIG. 1.
Figure 7C:
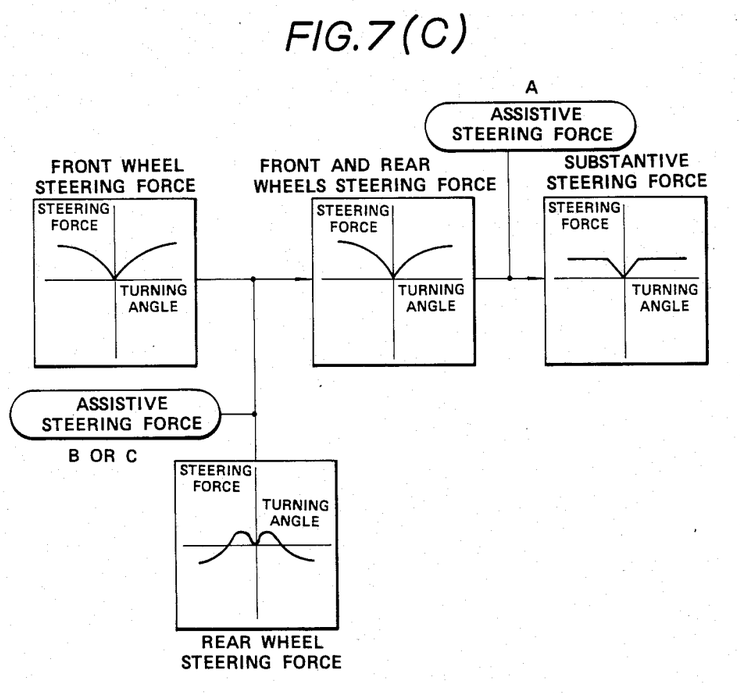
FIG. 7(C) is a view of a system for transmitting a substantial steering force in an arrangement in which the steering force assisting device is associated with a front wheel steering device, as well as with a linkage shaft, or a rear wheel steering device in the mechanism shown in FIG. 1.

Moreover, steering forces may also be improved by introducing forces for steering the rear wheels. More specifically, rather than combining a steering force assisting device A only with the front wheel steering device 100, one or more steering force assisting devices A may be disposed in a steering force transmitting path which comprises the front wheel steering device 100, the rear wheel steering device 200, and the linkage shaft 9.

Where the steering force assisting device A is associated with the front wheel steering device 100 as described above, a substantive steering force in the vicinity of the neutral steering position may be slightly increased or the steering wheel is made feel heavy as shown in FIG. 7(A). Where a substantive steering force which is larger than that in a 2WS vehicle in the vicinity of the neutral steering position is employed in a 4WS vehicle in which the steering wheel tends to be unstable during high-speed travel, the steering force as well as the vehicle maneuverability are improved, and steering stability is greatly increased.

Instead of combining the steering force assisting device A with the front wheel steering device 100, a steering force assisting device B may be combined with the linkage shaft 9 such that the power cylinder 40 is coupled to the linkage shaft 9, or a steering force assisting device C may be combined with the rear wheel steering device 200, as shown in FIG. 1. With this arrangement, a substantive steering force is slightly greater than that produced by a 2WS vehicle with no steering force assistance.

Where the steering force assisting device A is combined with the front wheel steering device 100, and the steering force assisting device B is combined with the linkage shaft 9 or the steering force assisting device C is combined with the rear wheel steering device 200, a resulting substantive steering force is similar to that produced by a 2WS vehicle with steering force assistance.

With the steering force assisting devices B, C combined with the linkage shaft 9 and the rear wheel steering device 200, respectively, a resulting 4WS vehicle has substantially the same steering force and vehicle maneuverability as those of a 2WS vehicle with no steering force assistance.

Stated otherwise, the nonlinear gear ratio arrangement may be provided in the rear wheel steering device 200 only or in the front and rear wheel steering devices 100, 200, and may be of a desired specific structure. The steering force assisting devices A, B, C may be electrically operated rather than hydraulically actuated. The 4WS system is not limited to the illustrated structure.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A mechanism for steering the front and rear wheels of a four-wheel-steerable vehicle, comprising:
a front wheel steering device operatively coupled to a steering wheel and having at least a rack-and-pinion gear mechanism having a nonlinear gear ratio which improves vehicle maneuverability;

a rear wheel steering device;

a linkage shaft operatively connecting said front wheel steering device and said rear wheel steering device to each other; and at least one steering force assisting device disposed in a steering force transmitting path comprising said front wheel steering device, said rear wheel steering device, and said linkage shaft.

2. A mechanism according to claim 1, wherein said steering force assisting device is combined with said front wheel steering device for assisting a steering force to turn front wheels.

3. A mechanism according to claim 2, wherein said front wheel steering device comprises:

a front wheel gearbox;

a steering shaft rotatably supported in said front wheel gearbox and having an end end coupled to a steering wheel and an opposite end having a first pinion;

a rotation output shaft rotatably supported in said front wheel gearbox and having an end end coupled to said linkage shaft and an opposite end having a second pinion; and a rack shaft slidably supported in said front wheel gearbox and including a first rack meshing with said first pinion and having a nonlinear gear pitch and a second rack meshing with said second pinion, said rack shaft being longitudinally movable through said first pinion and said first rack.

4. A mechanism according to claim 3, wherein said steering power assisting device comprises:

a power cylinder disposed in said front wheel gearbox;

a piston slidably fitted in said power cylinder and mounted on said rack shaft; and an oil pump mechanism communicating with said power cylinder for controlling oil supply thereto in response to rotation of said steering shaft.

5. A mechanism according to claim 1, wherein said rear wheel steering device comprises:

a rear wheel gearbox;

a rotation input shaft rotatably supported in said rear wheel gearbox and having an end coupled to an end of said linkage shaft and an opposite end having an eccentric shaft; and a joint rod slidably supported in said rear wheel gearbox and having a slider having a groove in which an end of said eccentric shaft slidably rides, said joint rod being longitudinally movable through said eccentric shaft and said groove.

6. A mechanism according to claim 1, wherein said at least one steering force assisting device is disposed in a steering force transmitting path comprising said linkage shaft and said rear wheel steering device for assisting a steering force to turn rear wheels.

7. A mechanism according to claim 6, further including a second steering force assisting device combined with said front wheel steering device for assisting a steering force to turn front wheels.

* * * * *

UNITED STATES PATENT AND TRADEMARK OFFICE
CERTIFICATE OF CORRECTION

PATENT NO. : 4,792,007

DATED : December 20, 1988

INVENTOR(S) : Abe et al.

It is certified that error appears in the above-identified patent and that said Letters Patent is hereby corrected as shown below:

Column 4, line 29, correct the spelling of --angle--;
        line 58, after "power," change "Cf" to --Cr--;
        line 62, change "m:" to --m is--.
Column 6, line 14, after "made" insert --to--.
Column 7, line 19 (claim 3, line 5), after "an" delete "end" (one occurrence);
        line 23 (claim 3, line 9), after "an" delete "end" (one occurrence).

Signed and Sealed this

Thirtieth Day of May, 1989

*Attest:*

DONALD J. QUIGG

*Attesting Officer*       *Commissioner of Patents and Trademarks*